May 24, 1927.
E. J. ROHNE
1,629,738
ELECTRICALLY HEATED STEAM BRUSH
Filed Dec. 8, 1924
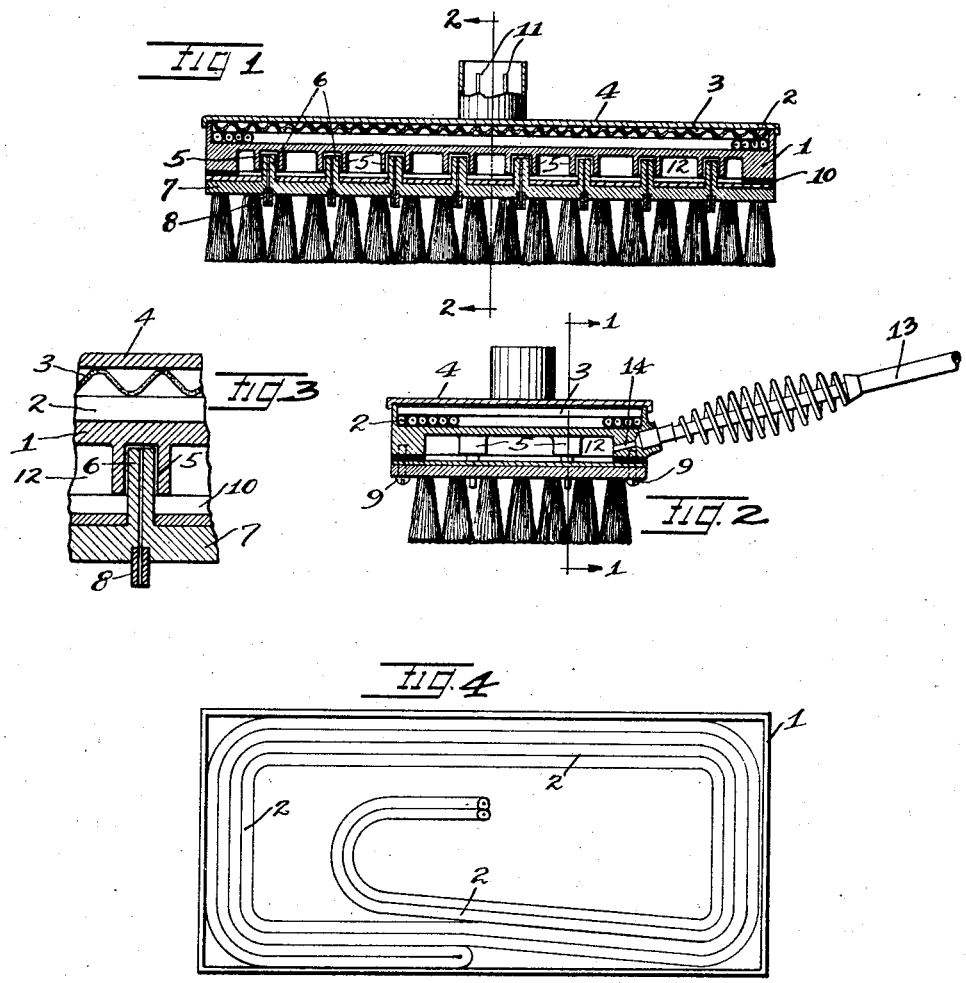
Inventor
EVEN J ROHNE
By C D Enochs
Attorney Patented May 24, 1927.

1,629,738

UNITED STATES PATENT OFFICE.

EVEN J. ROHNE, OF MINNEAPOLIS, MINNESOTA.

ELECTRICALLY-HEATED STEAM BRUSH.

Application filed December 8, 1924. Serial No. 754,658.

One object of my invention is to provide in a steam brush, self-contained means for superheating steam admitted to the brush.

Another object is to provide electrically heated means for drying the steam before it is passed out of the body of the brush.

Another object is to provide an electrically heated plate for a brush with means for causing the steam passing thru the brush to be held in intimate contact with a maximum amount of the heated surface of the plate.

With these and incidental objects in view, the invention consists of certain novel features of construction and combination of parts, the essential elements of which are hereinafter described with reference to the drawing which accompanies and forms a part of this specification.

In the drawing, Figure 1 is a section taken on the line 1—1 Figure 2. Figure 2 is a section taken on the line 2—2, Figure 1. Figure 3 is an enlarged sectional detail of one of the steam nozzles and Figure 4 is a plan view of electrical heating element.

As shown in the drawing, the plate 1 has an electrical heating element 2, carried on the top surface thereof and insulated therefrom by the corrugated asbestos 3 is a cover plate 4.

The plate 1 has a plurality of cups 5 depending therefrom, which receive therein with slight clearance, the bosses 6, carried by the bristle plate 7.

The bosses 6 have nozzles 8 therein, preferably projecting downwardly below the lower surface of the plate 7.

The cover plate 4 is attached to the plate 1 in any suitable manner and the bristle plate 7 is joined to the plate 1 by screws 9 clamping a steam tight gasket 10 between the plates.

The heating element is brought out through suitable terminals 11 and steam is admitted into the steam chamber 12 through the tube 13 and aperture 14.

It will be apparent that when steam is admitted to the steam chamber 12 in order to pass therefrom, it must pass between the walls of the cup 5 and the exterior surface of the boss 7 and as the clearance therebetween is slight, the steam passing through this tortuous passage is greatly heated by the plate 1, which is raised to a high temperature by the element 2. The steam passes out thru the nozzles 8, which are distributed among the bunches of bristles as shown and as the steam has been exposed to the surface of the heating plate 1, it is thoroughly dried before it escapes to the bristles.

I am aware that steam brushes have been used in the past, but the difficulty has been in having the steam sufficiently dry to be properly used, as it tends to condense in the brush and the garment or whatever is being cleaned, is soaked with hot water instead of being cleaned with dry steam. I believe myself to be the first to provide any self-contained means for insuring the delivery of dry steam to the brush bristles and especially believe myself to be the first to have devised electrical means for thus drying and superheating the steam.

While I have described my invention and illustrated it in one particular design, I do not wish it understood that I limit myself to this construction, as it is evident that the application of the invention may be varied in many ways within the scope of the following claims:

Claims:

1. In a brush, the combination including a body having a heating chamber and a fluid distributing chamber, a heating element within the heating chamber, bristle tufts carried by the body, a series of perforated bosses contained within the fluid distributing chamber and communicating with the bristles, a series of cups disposed over the bosses, so as to form annular restricted passages therewith, and adapted to be heated by the heating element, whereby the fluid in the distributing chamber will be heated before being discharged into the bristles.

2. In a brush, the combination including a body having a fluid inlet, and having a fluid distributing chamber communicating therewith and a heating chamber parallel therewith and adjacent thereto, a heating element with and adjacent thereto, a heating element within the heating chamber, said heating chamber extending substantially throughout the length and breadth of the body, bristle tufts carried by substantially the entire face of the body, said bristle carrying face having perforations, at intervals between the tufts, for discharging the fluid, and heat exchange means within the fluid distributing chamber, uniformly heated by said heating chamber, for lengthening the course of the fluid from the said fluid inlet to the said perforations.

3. In a steam brush, the combination with a brush back of means for heating said brush back, a bristle plate associated with said brush back and forming therebetween a steam chamber, cups depending from said brush back, bosses on the interior surface of said bristle plate registering in said cups with slight clearance therebetween and nozzles extending through said bosses.

4. In a steam brush, the combination with a heating plate of an electrical heating unit for said plate, a plurality of cups depending from said plate, a bristle carrying plate joined to said heating plate in steam tight manner, a plurality of upwardly extending bosses carried by said bristle plate concentrically positioned within said cups with slight clearance therebetween, nozzles extending through said bosses and bristle plate and means for admitting steam between said plate and said bristle plate whereby it may pass through tortuous passages between the interior walls of said cups and the exterior walls of said bosses and thru said nozzles.

5. In a steam brush, the combination including a brush back having a heating element contained therein, a plurality of cups depending from the back, a bristle carrying plate joined to but spaced from the back to form a chamber therebetween, said plate being provided with nozzle forming bosses which register and form restricted passages with said cups.

EVEN J. ROHNE.